US006604083B1

(12) United States Patent
Bailey (10) Patent No.: US 6,604,083 B1
(45) Date of Patent: Aug. 5, 2003

(54) MARKET DETERMINATION BASED ON TRAVEL TIME BANDS

(76) Inventor: G. William Bailey, 16 Fairfield Dr., Newark, DE (US) 19711

( * ) Notice: Subject to any disclaimer, the term of this patent is extended or adjusted under 35 U.S.C. 154(b) by 0 days.

(21) Appl. No.: 09/095,802

(22) Filed: Jun. 11, 1998

Related U.S. Application Data (60) Provisional application No. 60/049,448, filed on Jun. 12, 1997.

(51) Int. Cl.[7] ............................................. G06F 17/60
(52) U.S. Cl. ....................................... 705/10; 701/201
(58) Field of Search ............................... 705/1, 10, 14; 700/200, 201; 707/10; 701/201

(56) References Cited

U.S. PATENT DOCUMENTS

| | | | | |
|---|---|---|---|---|
| 5,285,494 A | * | 2/1994 | Spreecher et al. | 379/59 |
| 5,809,145 A | * | 9/1998 | Slik et al. | 380/25 |
| 5,884,312 A | * | 3/1999 | Dustan et al. | 707/10 |
| 6,047,234 A | * | 4/2000 | Cherveny et al. | 701/200 |

OTHER PUBLICATIONS

Daniel, Larry "GIS Helping to Reengineer Real Estate" Earth Observation Magazine, Nov. 1994.*
Kristiansen, Paul "Geographic Distributino of Nurseries in Brisbane" 1995. Downloaded from Internet <URL: www-personal.une.edu.au/~pkristia/Paul/Research/Nursery_project/nursery_project.html> [downloaded Jul. 30, 2001].*
Klosterman, Richard et al. "Retail Impact Analysis with Loosely Coupled GIS and a Spreadsheet" International Planning Studies, vol. 2, No. 2, 1997, starting on p. 175.*
Fung, D. et al. "Geographic Information Systems Technology for Business Applications" Journal of Applied Business Research, vol. 13, No. 3, summer of 1997, starting on p. 17.*
"Retooling: Mapping" Marketing Tools, Mar./Apr. 1996, starting on p. 40.*
Lang, L., Fox, S., 'Getting There with Software Maps', Mar. 1993, PC World, v11, n3, p. 182(7), Dialog File 47: Gale Group Magazine DB ™.*
Beiser, K., 'CD–ROM Report: Evolving Search Interfaces', Feb. 1995, Database (DTB), v18, n1, p. 88–92; Dialog File 484: Periodical Abstracts Plustext. Dialog Information Services, Accession # 02246255.*
Pallatto, J., 'PCs and Mapmaking: Cartographers have just begun to explore the potential of microcomputers', Mar. 18, 1986, PC Week, v3, n11, p. 57; Dialog File 275: Gale Group Computer DB ™. Dialog Information Services, Accession # 01176036.*

* cited by examiner

Primary Examiner—Kyle J. Choi
(74) Attorney, Agent, or Firm—Finnegan, Henderson, Farabow, Garrett & Dunner, LLP (57) ABSTRACT

A market analysis system uses travel time to define a relevant market area. A map is generated using stored geographical map information around a selected geographical point or area, and a travel time around the geographical point or area is selected. A trace is formed on the map around the geographical point within the travel time using travel time data, and market information is gathered from a database for the defined geographical area.

18 Claims, 13 Drawing Sheets

MARKET DETERMINATION BASED ON TRAVEL TIME BANDS

RELATED APPLICATIONS

This application is based on a United States provisional application Ser. No. 60/049,448 filed Jun. 12, 1997.

BACKGROUND OF THE INVENTION

FIELD OF THE INVENTION

This invention generally relates to a system for use in market analysis. More particularly, the system relates to using geographical map databases and geographical travel time information to determine a demand and supply for a market area.

DESCRIPTION OF THE RELATED ART

Before setting up a new business or buying an existing business, an entrepreneur wants to know the potential profitability of the business. To determine profitability, the net demand for the product or service must be determined. One important factor in determining net demand is the location of the business and the defined market area. Using the defined market area a supply and demand are determined. The net demand is found by subtracting existing supply from demand in the defined market area.

Market studies are performed in order to identify the supply and demand for a site in an area. This process may be carried out in many different ways because of differing definitions of the market area of interest. The market area of interest is the area in which customers reside and the area in which competitors are likely to be located.

Market analysts determine supply information by researching an area and finding out information such as the number and types of competitor sites. Generally, market analysts look at many different demographic components to determine demand. For example, one component of demographic demand for an assisted living home may be that a certain percentage of those aged 65 to 75 in the area who have incomes over $25,000 will enter the proposed assisted living home. Based on the number of people in the age group 65–75, one may estimate the number of people and dollars that will be spent at the assisted living home by this age group. An accumulation of these data for each age group estimates gross revenue for the assisted living home.

One source of information about the characteristics of people in an area is the U.S. Bureau of Census, which counts people and keeps record of the number of people living in a defined area along with other identification data. The Census Bureau accumulates this information by house and by individual but for privacy reasons only releases information in groups. The smallest group normally released is a block group. A block group is about 200 households. A group of four to six block groups is called a census tract. A census tract tends to be smaller than a zipcode and is commonly used to aggregate information about an area. The census bureau maintains this information in databases that may be purchased or accessed by the public. These databases include lists of block groups and demographic information associated with the block groups.

Another source of information needed is geographical information that links an area to the census information. Geographic information systems exist that include typical map data such as geographical features, roads, and landmarks as well as the boundaries for block groups. The geographical linear features, such as roads or geographic boundaries, are stored as polylines. The geographical area features, such as block groups, census tracts, and counties, are stored as polygons enclosed by polylines. The two are stored in a table together with census identifying data, which allows the geographical areas to be tied to demographic characteristics in the census databases.

One type of study performed by a market analyst is a point study. A point study is performed when an investor wishes to know the demand for a business at a particular site. To calculate demand for a business at a geographical point, an analyst must define a market area surrounding that point for the given business. Typically an analyst will define more than one market area, such as a primary and secondary market area. One simple method an analyst may use is to plot the site on a map and draw a circle around of the site of a given radius. The first radius selection of, for example, ten miles could be the primary market area, and a second selection of, for example, the next ten miles could be the secondary market area.

Previously, a market analyst would select some section of the map and assume that this is the market area. Often, a junior member of the analyst's firm goes out into a community and talks to the people of interest and uses the gathered information to define a market area. Then, to determine demand, a market analyst would calculate the number of potential purchasers in that area and the amount that these potential purchasers are expected to spend using the census information, to determine supply, the analyst would look at other suppliers in the market area. Using both the supply and demand information, a net demand can be determined. There are no set standards of how the initial market area is selected or which census tracts or block groups are included in that market area. The results may be easily manipulated by simply redefining the market area, thus greatly reducing the legitimacy of such studies because the results are not replicable by another analyst with the same skills and background.

A system is needed that standardizes the selection of a market area and allows for reproducible studies.

SUMMARY OF THE INVENTION

Systems and methods consistent with the principles of the present invention address the need for standardization of market selection by defining a market area based on travel time from the site.

A system and method consistent with the principles of the present invention selects a primary and a secondary market area based on travel time. More than two market areas may also be selected. In addition block groups are accepted as being within the market area based on certain rules, thereby standardizing their selection.

Systems and methods consistent with the present invention generate a map using stored geographical information. A geographical point or area is selected from the map for analysis. A travel time around the geographical point is selected. The geographical area around the geographical point within the travel time is defined using data holding travel time information. Market information stored in a database is gathered for the defined geographical area from a memory location. Demand is computed from the demographic groups in each travel-time-defined area and weighted according to the model used by the analyst. Supply of competition is computed by surveying the competition and plotting each on the map, weighing the results by travel time and other factors according to the model used by the analyst. The final result, net demand, is the difference between demand and supply.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION OF THE INVENTION

The following detailed description refers to the accompanying drawings in which the same reference numbers in different drawings identify the same or similar elements. However, the following description does not limit the invention. Instead, the scope of the invention is defined by the appended claims and equivalents.

The present invention provides a way of defining the market area that may be repeated by another analyst which allows for a standard in the industry. Instead of using miles around a point which ignores barriers like a river or using psychological boundaries, which are not replicable, the present invention uses travel time. A database contains the travel time traces from the proposed site in the geographical area under study.

The analyst selects travel times based on empirical research that relates travel time to use of the proposed facility. Where existing empirical research is inadequate or not available then the travel time is selected using a reasonable estimate of an experienced analyst. Travel time is objective unlike other methods used such as basing market area on psychological characteristics of the population. This latter method has no rules about where the market will begin and end.

Using travel time to define a market area is most reliable when the business or service draws local patronage. For example, assisted living facilities are typically selected that are either close to the disabled's home if the spouse remains active or close to the home of a relative.

Figure 1:
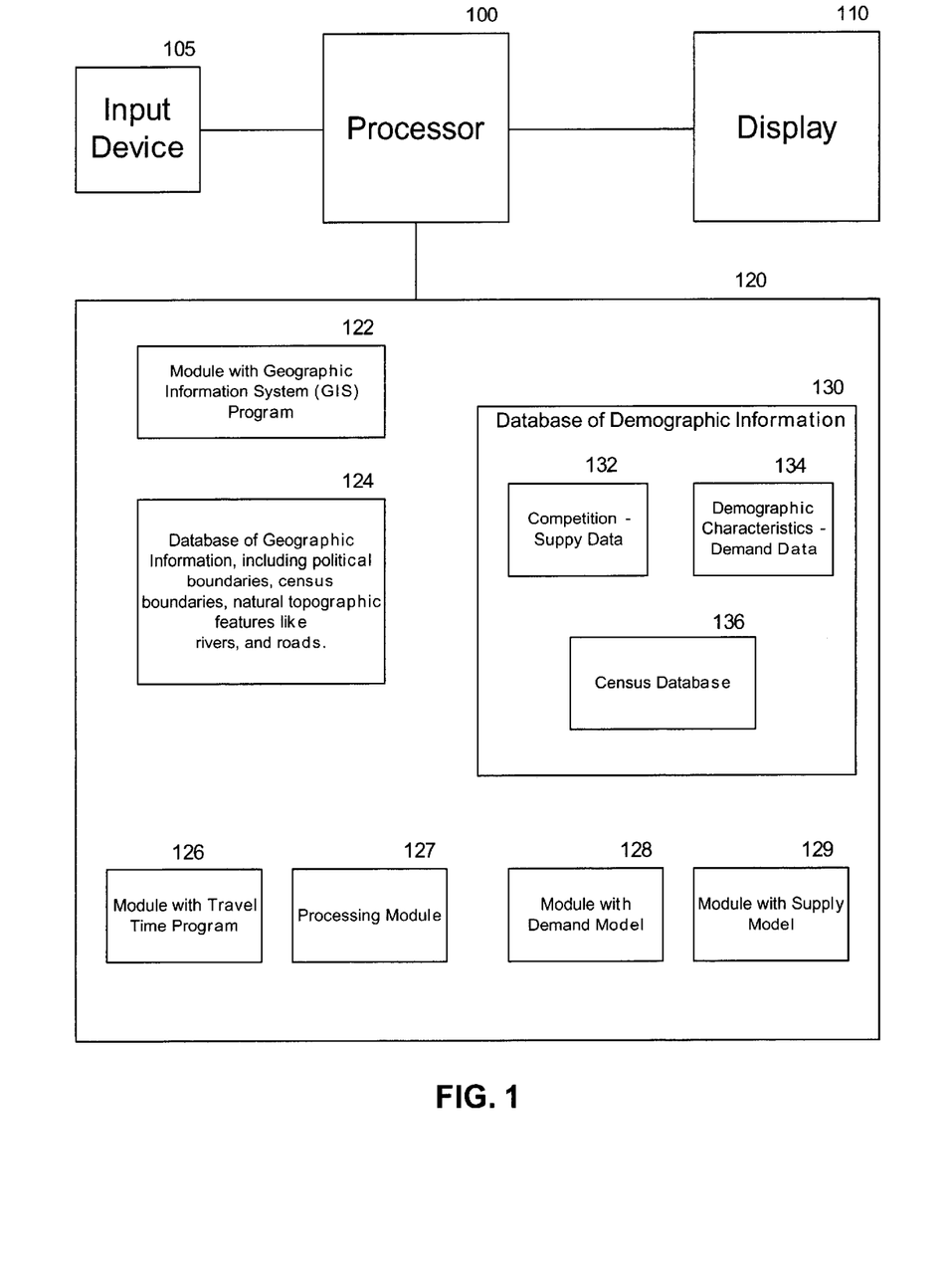
FIG. 1 is an overall diagram of a system for implementing the present invention.

FIG. 1 shows a block diagram of a processor configured in a manner consistent with the present invention. A processor 100 receives input from an input device 105 and displays information on a display 110. Memory 120 includes a module with geographic information system program (GIS) 122, a module with travel time program 126, a processing module 127, a module with demand model program 128, and a module with supply model program 129. The module with demand model program 128 includes, for the area under consideration, empirical relationships or assumptions concerning the relationships between demographic demand and travel time, such as the decay of demand with increased travel time from the site. The module with supply model program 129 includes, if available for the area under consideration, empirical relationships or assumptions concerning the relationships between supply of competition and travel time.

Data in the geographical information database 124, includes political boundaries, census unit boundaries, natural topographical boundaries including rivers and roads. The database of demographic information 130 includes supply data 132, demand data 134, and a census database 136. Supply data 132 is data related to competition such as other stores in an area. Demand data are demographic information providing information on the population in an area. Census database 136 includes information relating the census units to demand data 134 and supply data 132.

Figure 2:
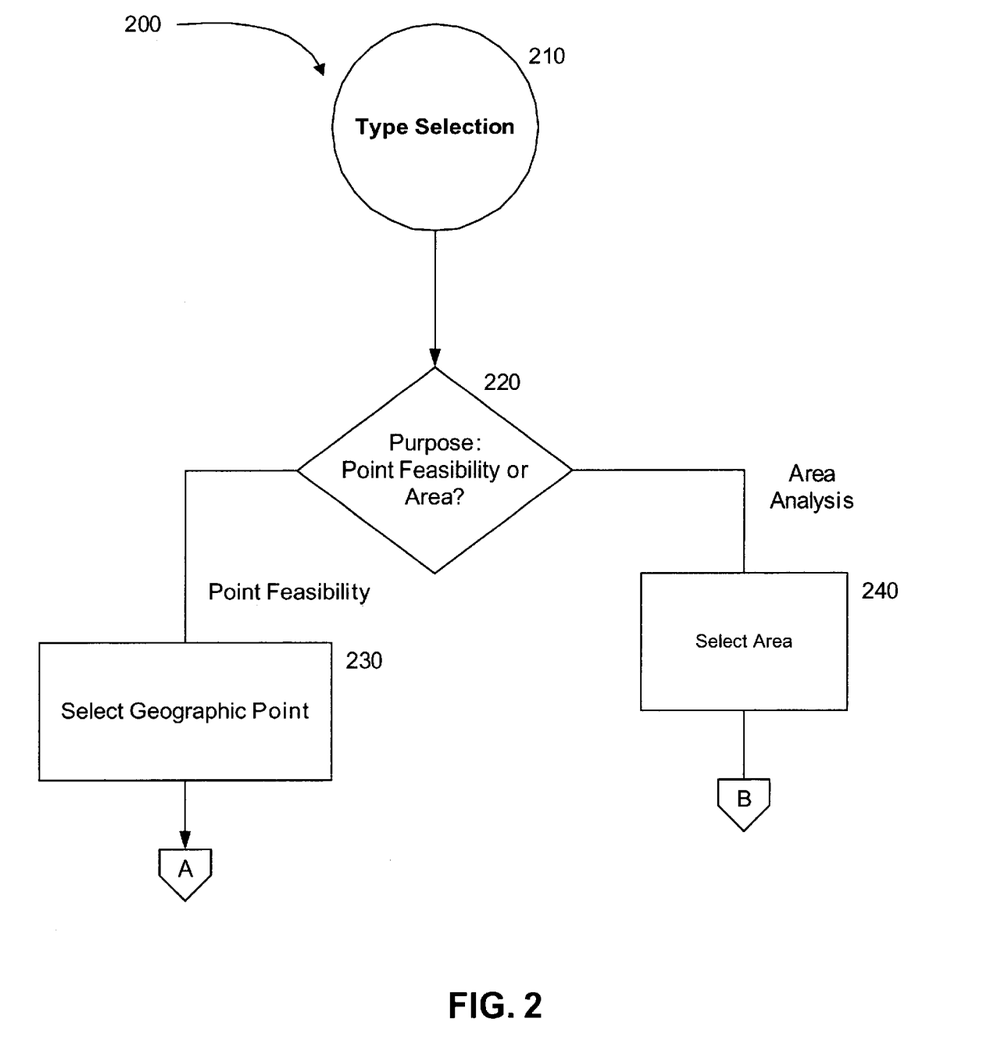
FIG. 2 is a flow chart showing the steps for selecting a type of market analysis.

FIG. 2 is a flowchart showing the initial steps 200 taken by an analyst to a market analysis. First, a market analyst, using input device 105, must select a type of market study (step 210). Generally, a market analyst may select one of two types of market analysis—a point feasibility study or an area feasibility study (step 220). The point feasibility study determines the market analysis for a site in a specific location.

An area analysis study is used to try to determine the best site locations in a general area. An analyst performs an area study when an investor wishes to find what point within a geographical area is best for business. In the prior art, only a few points were processed as it was time consuming to analyze each point. An area study using the present invention, involves analyzing every possible point in an area using the point analysis. In one implementation some points on the map, such as those where bodies of water lay or a large factory exists, will not be analyzed. Generally, in the present invention, an area analysis allows the analyst to select a geographical area and to iterate a point analysis for almost every point within that area equal to the number of demographic units (e.g. block groups, census tracts), covering the area completely.

If a point feasibility is selected, the analyst must select a specific geographical point (step 230). For an area analysis the analyst must select a geographical area and processing continues at B in FIG. 9 (step 240). The point feasibility study determines the market analysis for a site in a specific location.

Figure 3:
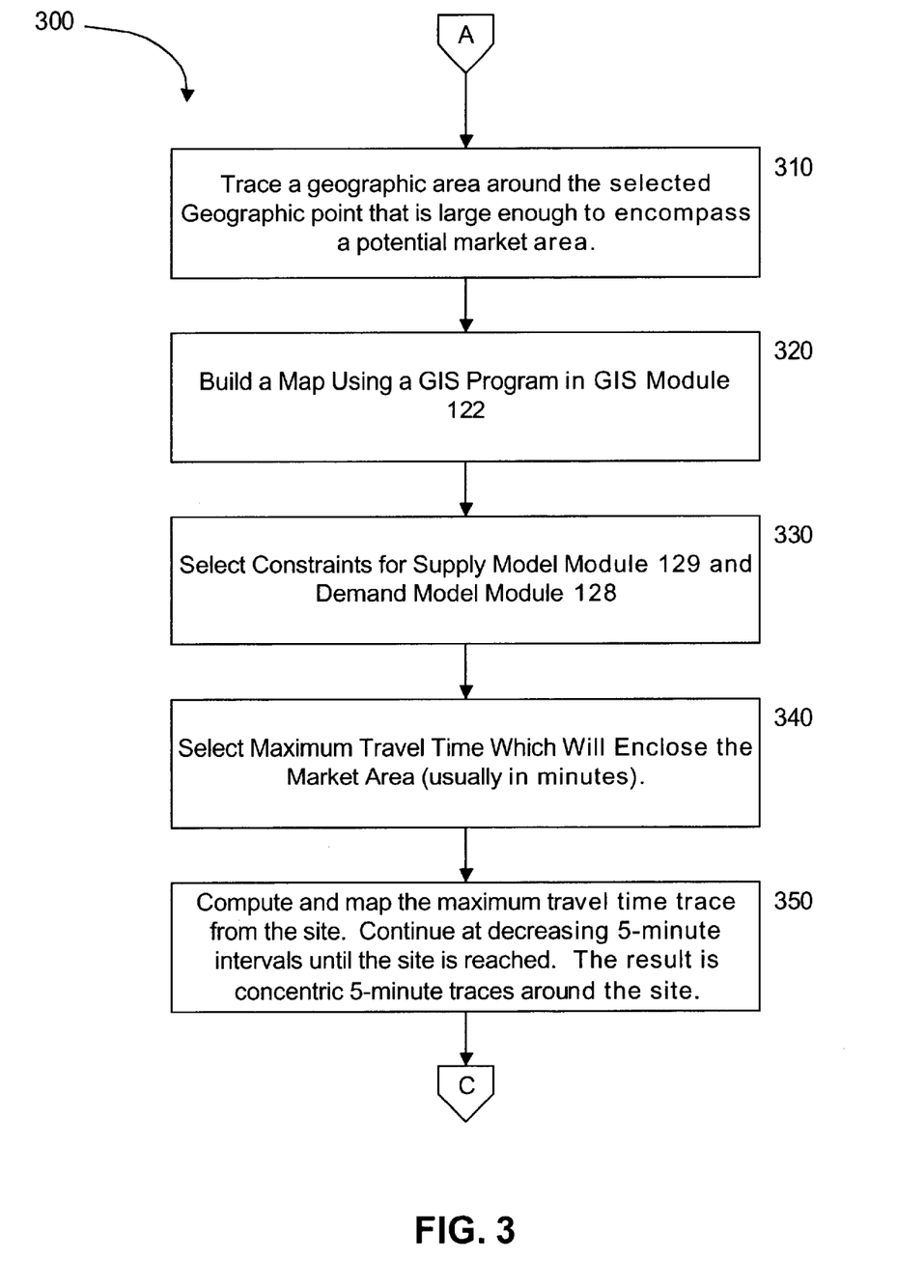
FIG. 3 is a flow chart showing the steps for performing market analysis.

If point analysis is selected processing continues as shown in steps 300 in FIG. 3. First, the analyst traces an area around the geographical point that encompasses any potential market area using knowledge known to the analysts such as type of neighborhoods around the point (step 310). The analyst also has access to many other sources of data including information obtained from the Bureau of the Census and other sources. GIS programs, such as that in GIS module 122, create a map for the traced area around the geographical point (step 320). The analyst may specify the different attributes of the displayed map, for example, the units that the map uses in terms of scale (centimeters per mile) or what natural formations the user wishes to have included. The user may select to display streets, landmarks, county boundaries, towns, Census boundaries, and many different types of units. The GIS program 122 generates the map by reading data from geographic database 124 that holds map information.

The analyst selects constraints to define the supply model module 129 and demand model module 128 (step 330). The analyst uses a model that defines the weight that will be given to different information. For example, based on available empirical evidence for a certain service, the customer base may exclude anyone under 20 and give no weight to data on those under 20. On the other hand, the most likely customers for a certain business may be aged 30 to 40, in which case the demand model will weigh more highly people in that age group and a greater percentage of those in the age group of 30 to 40 will be presumed to be customers. Similarly, a smaller percentage of those in the age group 40 to 50 will be presumed to be customers. Another constraint in the models may be assigning different percentages for each travel time trace around the site based on the closeness of the trace to the site.

Figure 4A:
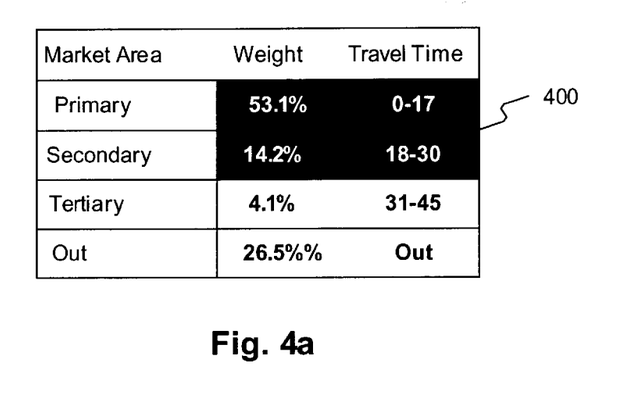
FIGS. 4a–4c are example display screens showing information related to a market demand model.

FIG. 4a shows an example display 400 of different weights assigned to different travel traces. The closer to the site a census unit is, the more likely customers will come from that census unit. The demand is determined by adding up the number of people, the demand model defines to be of interest. The supply is determined by using gathered information about other suppliers in the area. The net demand is the projected demand in the area minus the supply in that area. If the net demand is positive, with the demand greater than supply, the project may be desirable. If the demand is negative, with demand less than the current supply, then the project is not desirable.

Figure 4B:
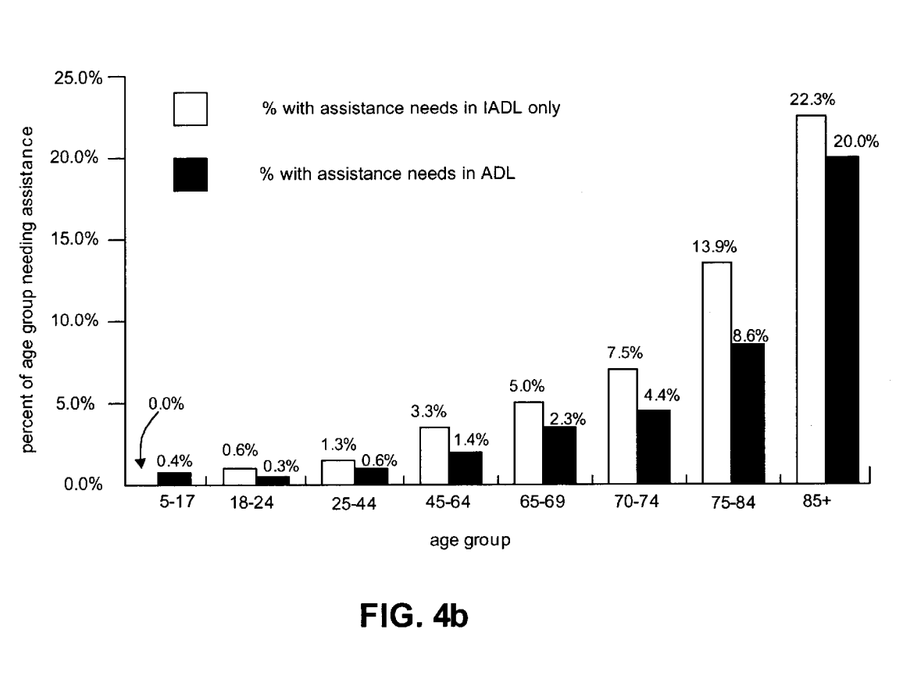

One example of a demand model is for assisted living homes. One component of the demand model is the percentage of people in given age groups that require care. FIG. 4b shows a chart listing various age groups and the percentage of people in those groups requiring two different levels of care.

Figure 4C:
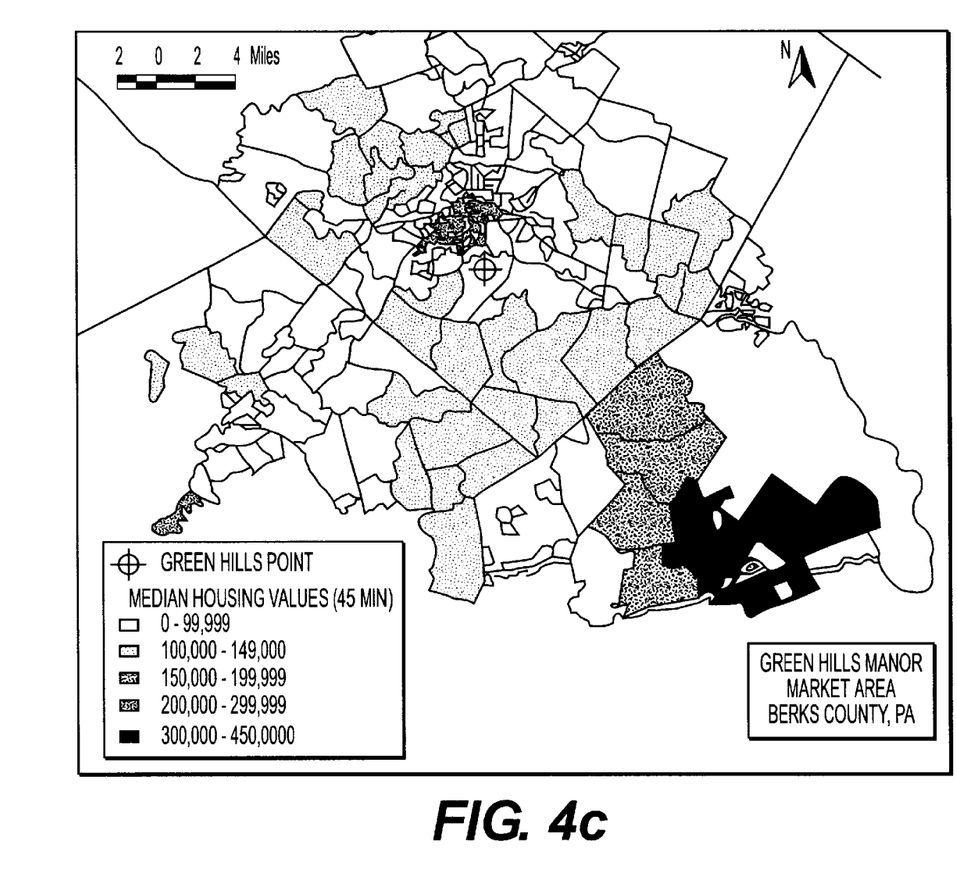

Another criterion for the demand model may be related to housing values. Population groups may be weighted differently based on the median home values in the block group. FIG. 4c shows an example of a map of census block groups with different shadings provided based on the median house value. The model may weight more highly the population in higher priced home value block groups. Therefore, this example model has age constraints, disability constraints and housing value constraints. The calculation of demand will adjust the weight given to a population group based on age, disability and housing values.

Figure 5A:
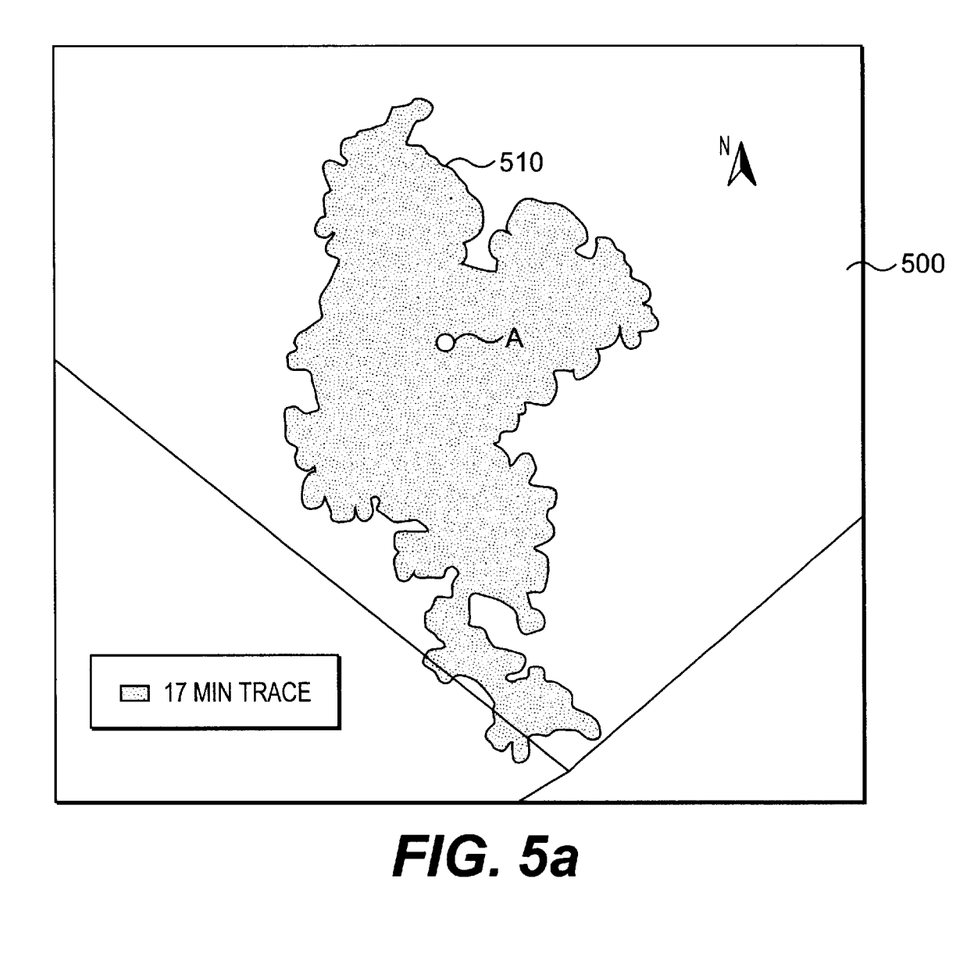
FIGS. 5a–5e are example display screens showing a map and associate travel time traces.
Figure 5B:
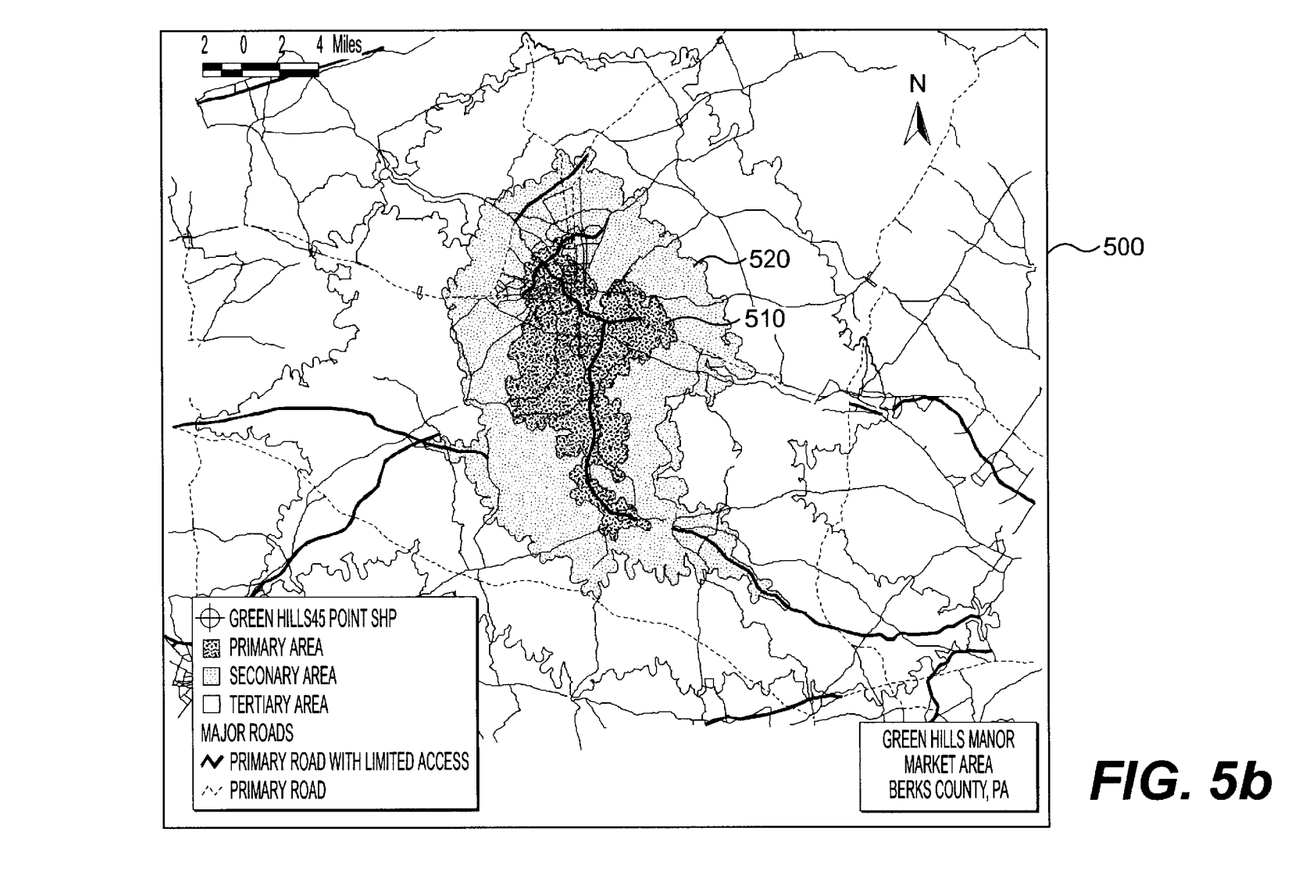
Figure 5C:
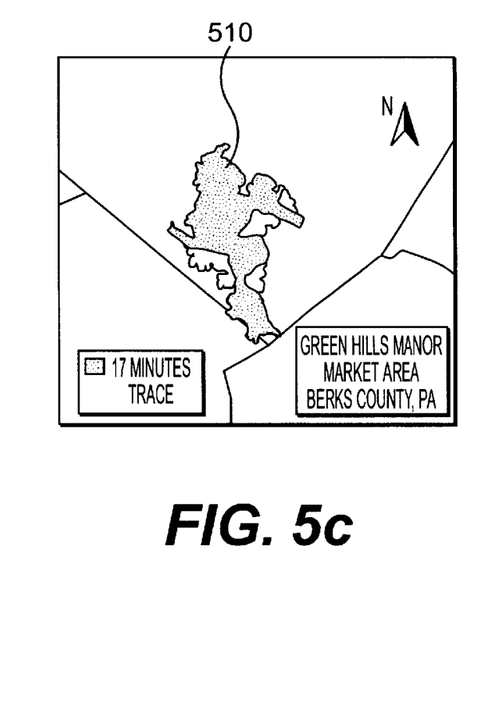
Figure 5D:
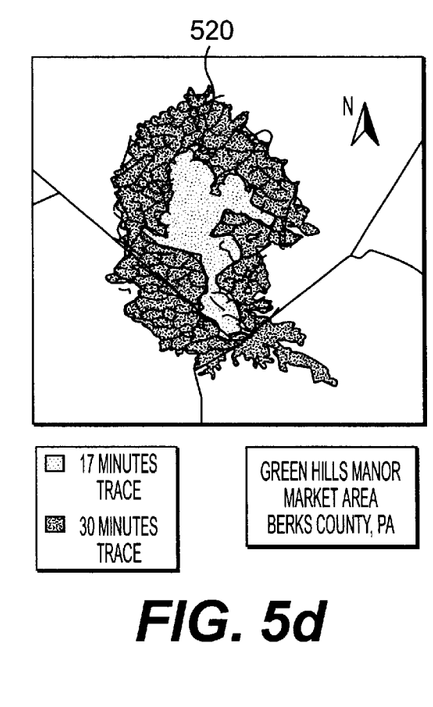
Figure 5E:
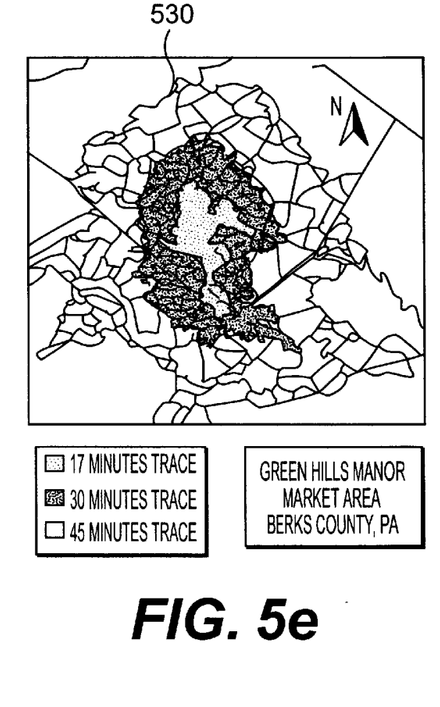

Processing module 127 prompts the analyst to select a maximum travel time that encompasses the traced area (step 340). FIG. 5a shows a display of a map 500 with the selected geographical point A at the center and a time travel trace 510 around the point. The selected maximum travel time is usually in minutes, for example, a trace representing a 20 minute trip from the point may be a likely market area depending on the business. Travel time program module 126 maps the maximum travel time trace from the site and maps decreasing intervals until the site is reached (step 350). The result is concentric traces around the site. Another example of an interval trace would contain a trace for every few minutes of additional travel time. FIG. 5b shows a map 500 with three travel time traces 510, 520, and 530 at different intervals from the site. FIG. 5c shows the first travel trace closest to the site representing a 17 minute travel time around the site. FIG. 5d shows a second travel trace representing travel times between 17 and 30 minutes around the site. FIG. 5e shows a third travel trace representing travel times between 30 and 45 minutes around the site.

The travel time program module 128 uses available travel time databases and generally operates as follows. A database of street networks, such as the Bureau of the Census' Tiger Street Files, has information on travel rates on different roads. The street file is converted into a network of nodes (intersections) and connections between the nodes (streets). Each line segment (street) has associated data about the class of road and other information such as one-way street or no left turns. The class of road determines the average speed or rate (R) to be used and the length of the line segment defines a distance (D). The time to travel over a line segment is found by dividing distance (D) by the rate (R). The program 128 solves the network by following every possible path from the geographical point selected and sums the travel times for each segment until the travel time selected is reached at a point on the map. The resulting points around the selected point form an irregular trace of the market area.

Figure 6:
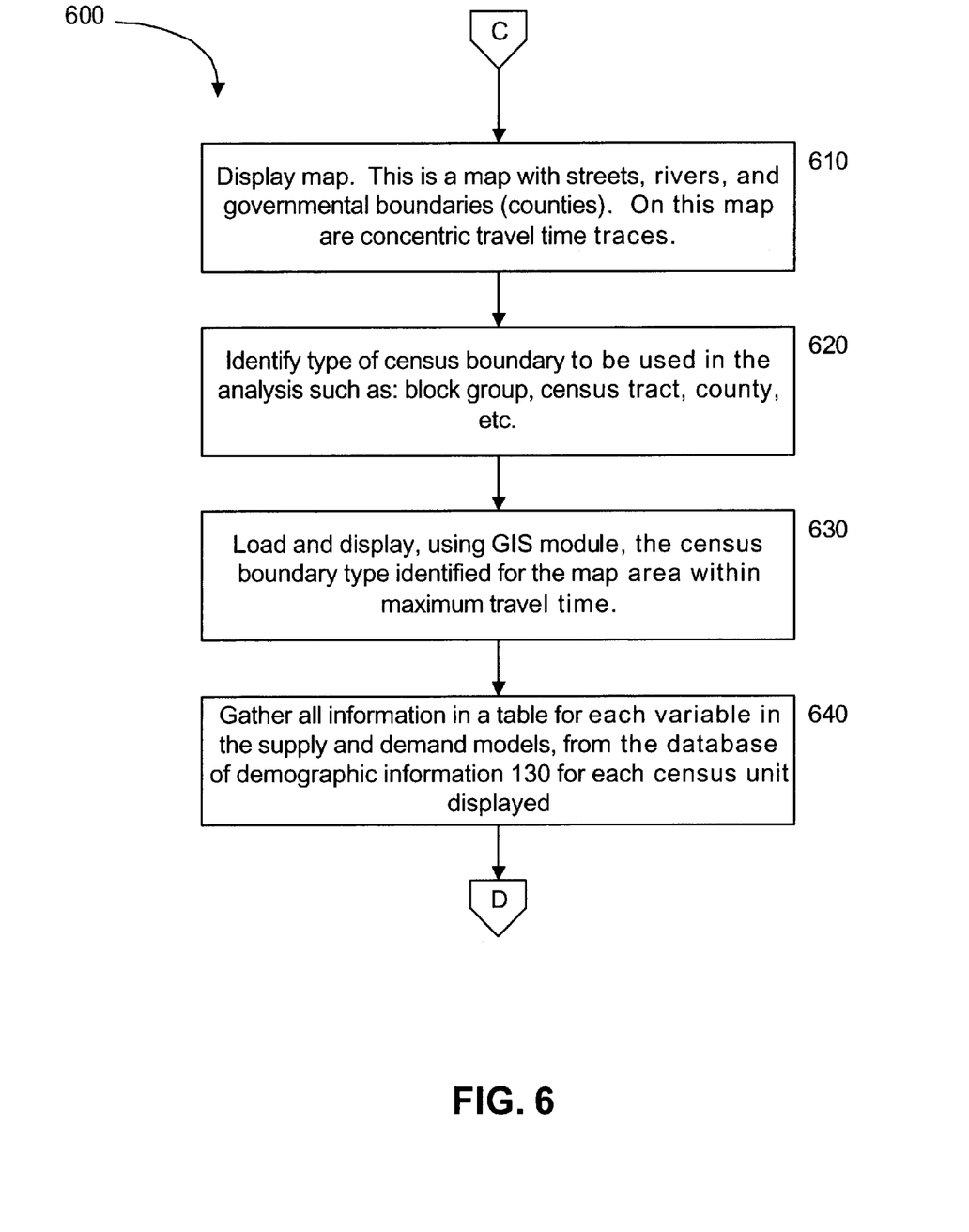
FIG. 6 is a flowchart showing additional steps for performing market analysis by using demographic data.
Figure 7:
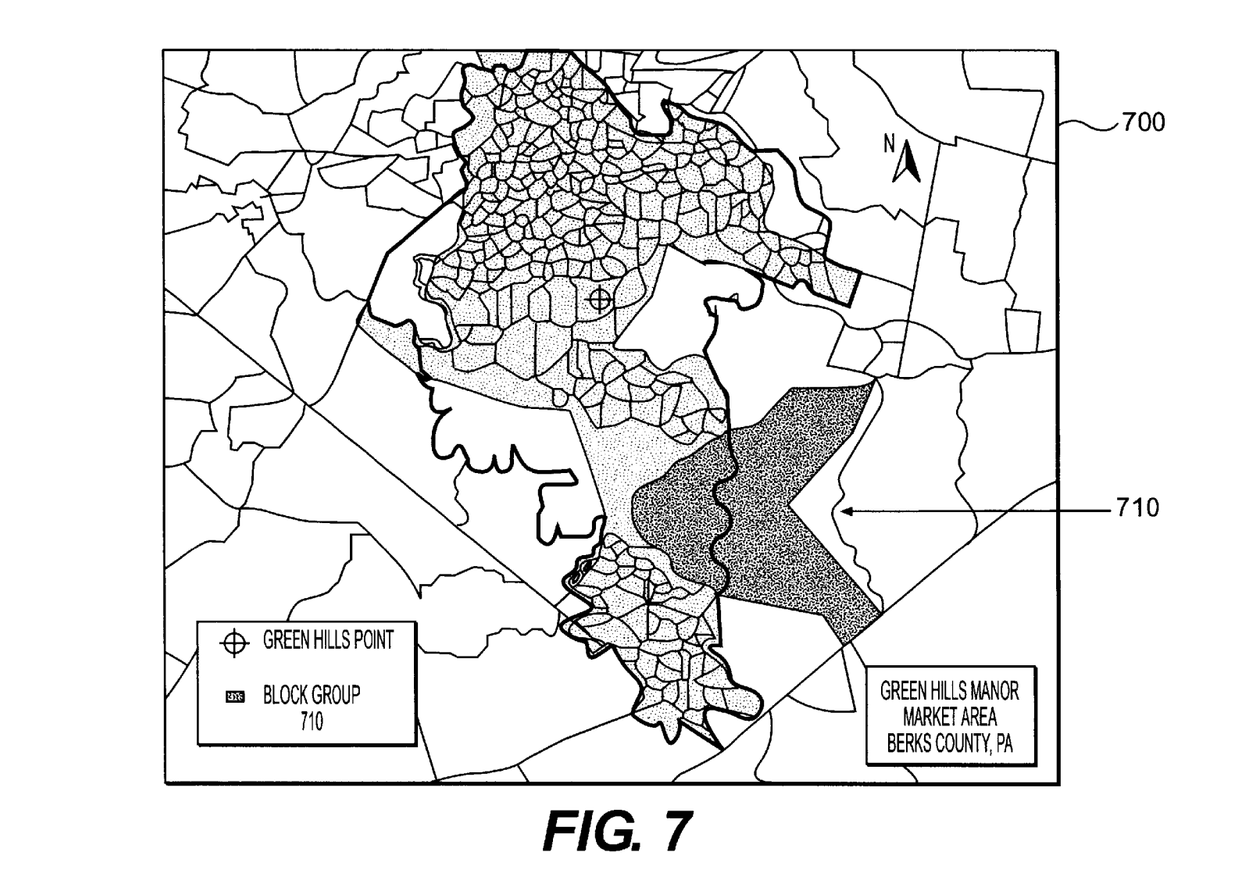
FIG. 7 is a sample screen display of a map with block groups.

Processing continues in FIG. 6 which shows flowchart 600 with additional processing steps. Travel time program module 126 displays a map having typical map information such as rivers and roads using data in the geographic database 125 for the traced area (step 610). The map also shows the concentric travel time traces. The analyst must now select a type of census boundary to be used in the market analysis such as a block group, census tract, or county lines (step 620). For simplicity the specific example used throughout this application will assume that the analyst selects block groups as the unit of interest. Next GIS module 122 loads and displays the census boundary type on the map area within the maximum travel time (step 630). FIG. 7 shows a map display 700 with block groups inserted.

Processing module 127 creates a market area table with an entry for each census unit displayed (step 640). Columns are included for each variable in the supply and demand models and data corresponding to the variables is copied from the demographic information database 130.

Figure 8:
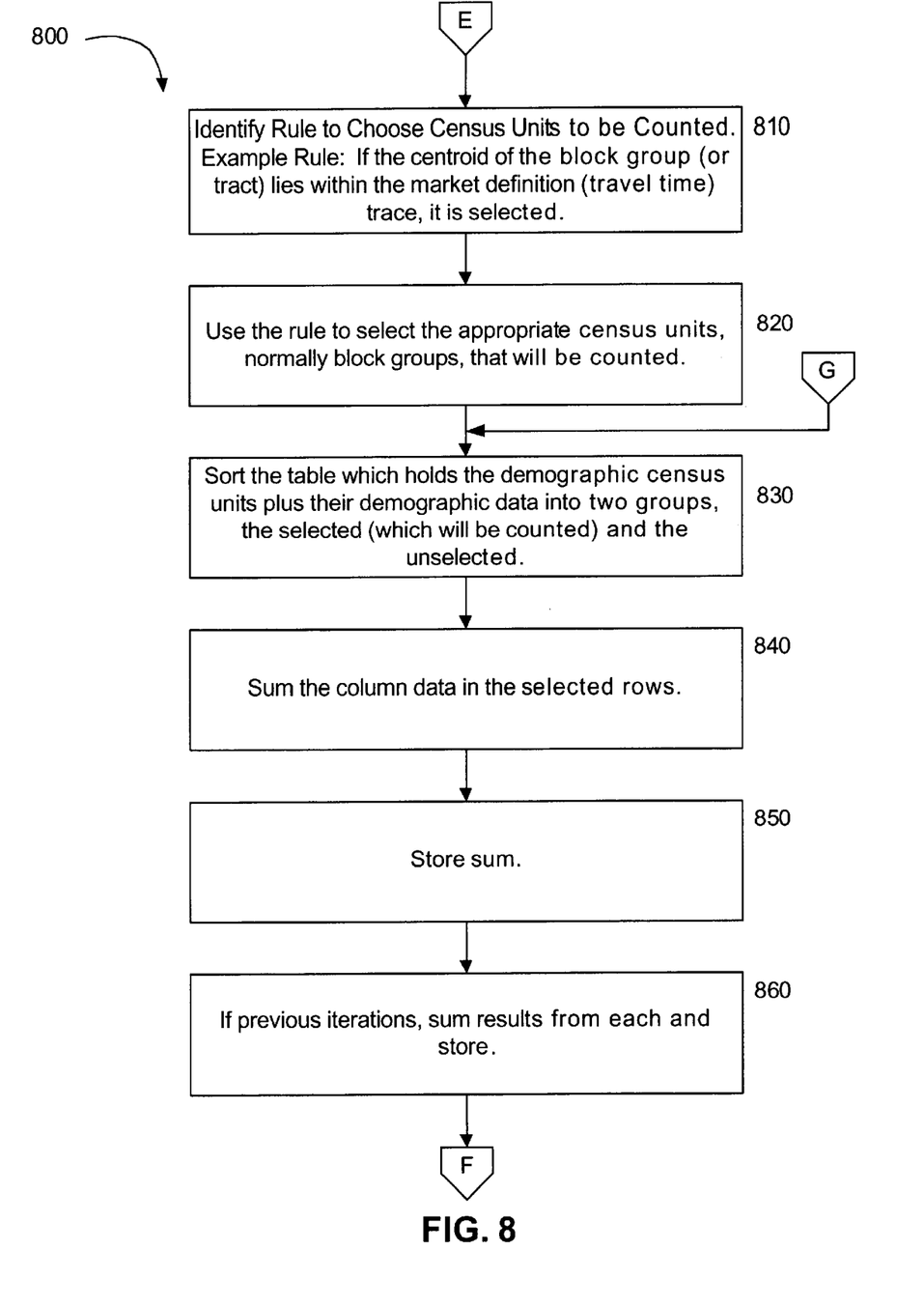
FIG. 8 is a flowchart showing additional steps for performing market analysis including summing demographic data.

FIG. 8 shows a flowchart 800 with additional steps for analyzing a market consistent with the present invention. The analyst must now select which block groups to include in the market study. For example, some block groups may only be partially within the maximum travel time, therefore the analyst must decide how to select which groups to include in the analysis and the weight to be provided to each group. For example in FIG. 7, block group 710 is a group only partially within the travel time trace 510. The analyst may select a rule to choose block groups (step 810). One example rule is to determine the centroid of a block group and if the centroid is within the travel time trace include the entire block group in the analysis, otherwise do not. Processing module 127 uses the identified rule to select the appropriate census units to be counted (step 820). The market area table created by the processing module 127 is sorted to separate the selected and non-selected block groups (step 830). In FIG. 7, block group 710 has a center that is not within the travel trace 510, this block group is not selected using the example rule. Processing module 127 sums the column data for each of the rows selected (step 840) and stores the same (step 850). Each column corresponds to a variable in the demand or supply model. The summed results for a column is the total value for the associated variable.

Entry point G shown above step 830 is where processing begins for additional traces of market area to be studied.

Each travel time area trace may be successively processed. Therefore, after summing the columns for a particular market area, if results for shorter travel time traces exist, the current summed results are added to the previously obtained summed results (step 860). The demand or supply model may require that before summing results from different iterations, each iteration's trace be provided a different weighted value, the weights being empirically based when possible. Therefore, the summed value of the supply or demand components for a trace may first be multiplied by a weighting factor reflecting that trace's closeness to the business site.

Figure 9:
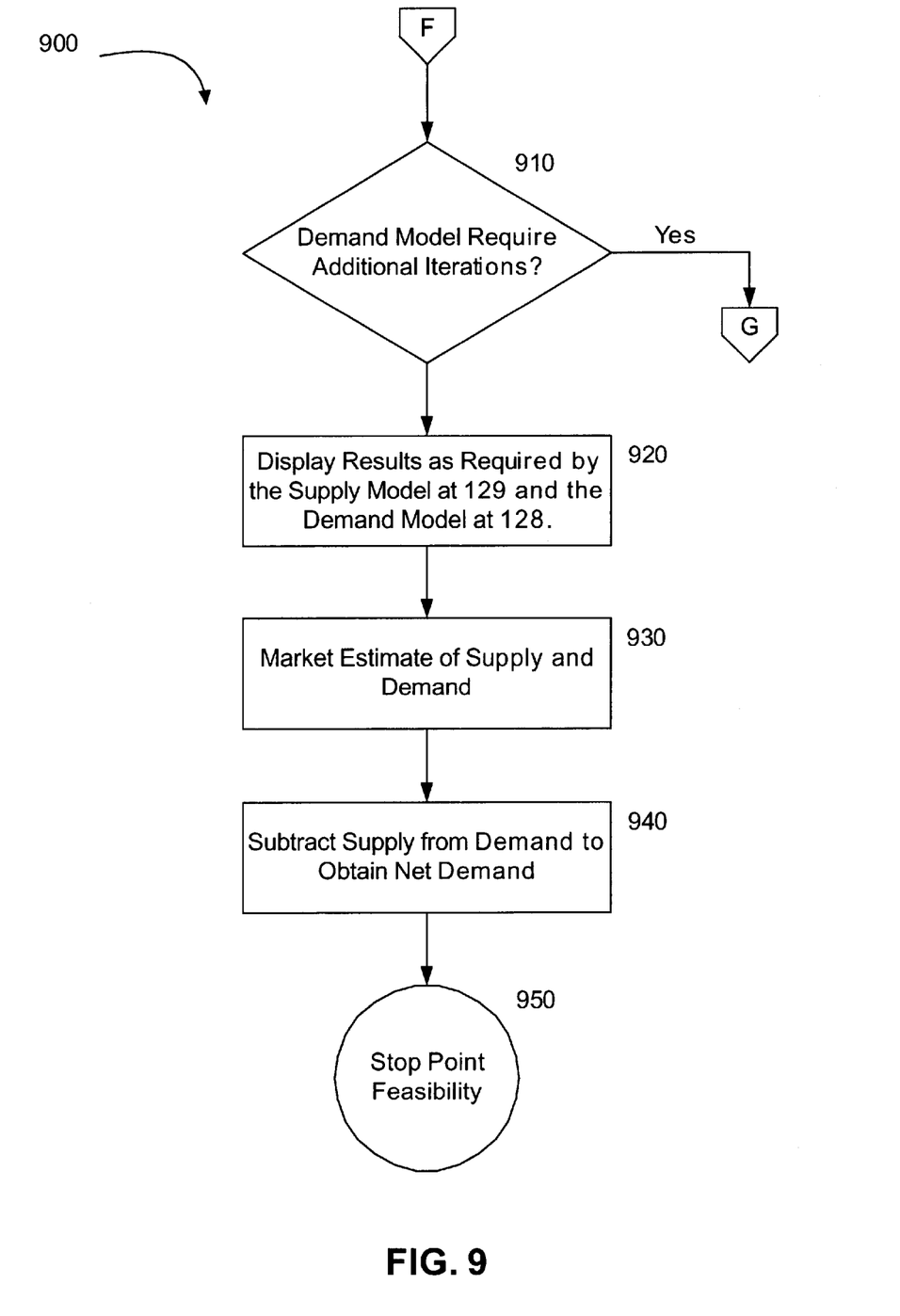
FIG. 9 is a flowchart showing additional steps for performing market analysis including calculating supply and demand.

FIG. 9 shows a flowchart 900 for further processing market analysis according to the present invention. Processing module 127 determines whether the demand and supply models require additional iterations for processing additional traces of travel time (step 920). If so, processing repeats starting at step 830 in FIG. 8. Otherwise, the final summed results are displayed (step 930). The market estimate of supply and demand is determined (step 940). This estimate may be based on calculations of the market and demand supply models or may be input by an analyst reviewing the displayed summed column data. The estimated supply is subtracted from the demand to obtain the net demand (step 950). The point feasibility study is complete (step 960).

Figure 10:
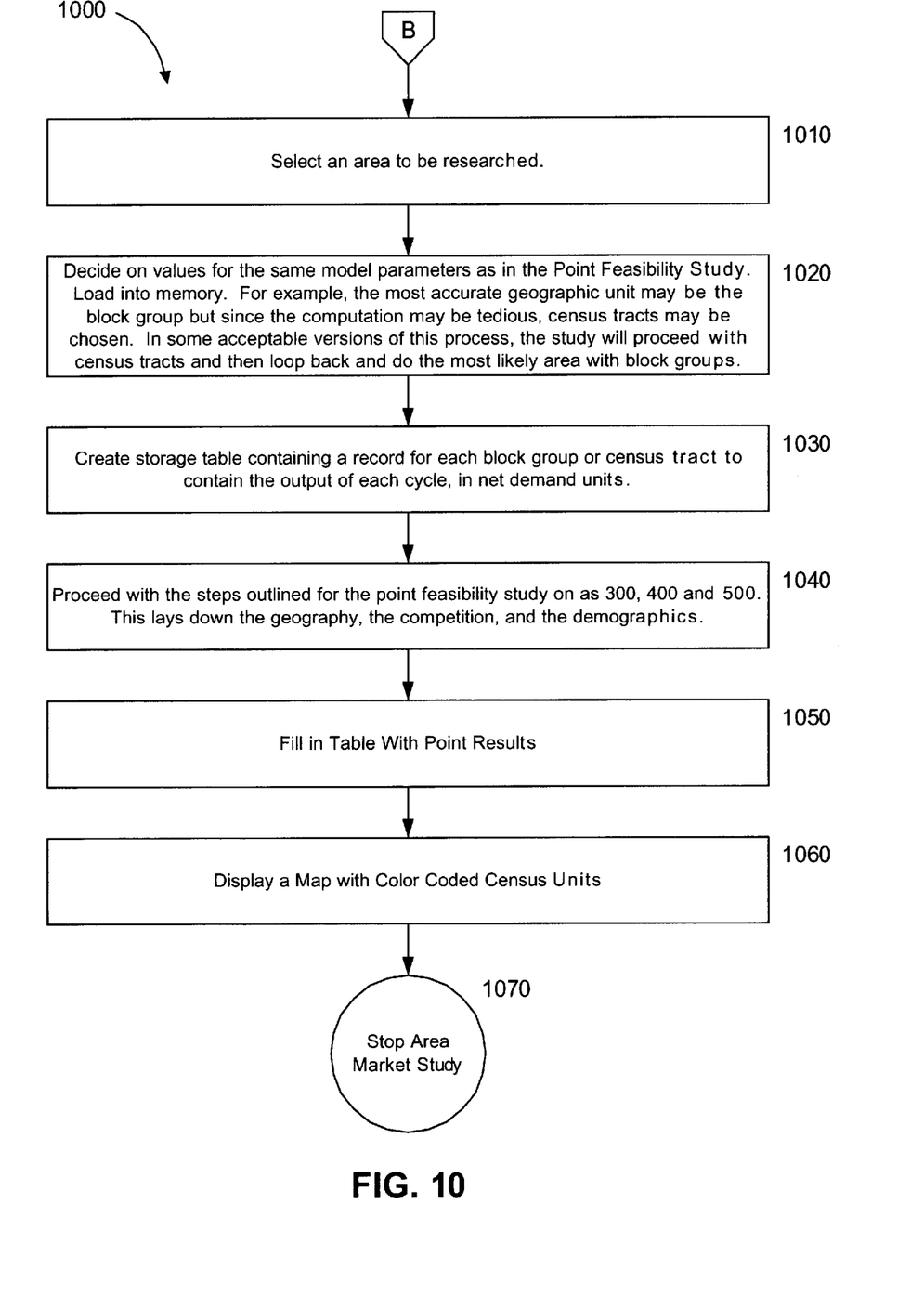
FIG. 10 is a flowchart showing the steps for an area feasibility study.

FIG. 10 shows a flowchart 1000 that includes the steps for an area feasibility study. As previously discussed, an area feasibility study is performed by selecting rule that defines one point within each of the census or administrative boundaries such as block group. First, the analyst selects a geographical area to be researched (step 1010). The analyst must select a unit such as a block group or some other boundary to use in the analysis (step 1020). Then, each unit within the selected area is given a row in a newly created storage table containing a record for each unit, such as a block group (step 1030). The point feasibility study is repeated for all possible points within the area (step 1040). Processing module 127 fills in the table with the results of the point studies for each census unit as the point studies are performed (step 1050). Processing module 127 uses display 110 to display a map with color coded filling to show the different demand levels calculated for each census unit (step 1060). The market area analysis is the complete (step 1070).

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, although systems and methods consistent with the present invention are described as using block groups as the defined unit of measurement, one skilled in the art will appreciate that the present invention can be practiced using other units of measurement or definitions of map areas. Also, although systems and methods consistent with the present invention are described as using a primary and secondary market travel trace time, one skilled in the art will appreciate that the present invention can be practiced using fewer or greater numbers of travel time traces.

What is claimed:

1. A method for determining a market area comprising:
   receiving a potential market location and a maximum travel time;
   defining a preliminary market area around the potential market location using the maximum travel time from that potential market location;
   defining, within the preliminary market area, bands reflecting increasing travel time from the potential market location;
   weighting the bands according to a market-related factor; and
   determining a final market area based on the weighted bands.

2. The method of claim 1, further comprising:
   determining a market for a desired commodity or service in the final market area based on the weighted bands.

3. The method of claim 2, further comprising:
   determining a net demand for the commodity or service in the final market area.

4. The method of claim 1, wherein weighting the bands according to a market related factor further includes weighting the bands based on empirical data drawn from within the preliminary market area.

5. A method for preparing a market study comprising:
   defining a geographic area around a selected location, the geographic area corresponding to a market based on a selected maximum travel time;
   defining a plurality of bands based on increasing travel time from the location;
   selecting geographic units in the bands;
   defining market-related variables for the market;
   calculating values corresponding to the market-related variables for each of the selected geographic units; and
   calculating a net demand for a service or a commodity in the market based on the values.

6. The method of claim 5, wherein selecting the geographic units includes determining whether a centroid corresponding to the geographic units falls within at least one of the bands.

7. A system for determining a market area, the system comprising:
   means for receiving a potential market location and a maximum travel time;
   means for defining a preliminary market area around the potential market location using the maximum travel time from that potential market location;
   means for defining, within the preliminary market area, bands reflecting increasing travel time from the potential market location;
   means for weighting the bands according to a market-related factor; and
   means for determining a final market area based on the weighted bands.

8. The system of claim 7, further comprising:
   means for determining a market for a desired commodity or service in the final market area based on the weighted bands.

9. The system of claim 8, further comprising:
   means for determining a net demand for the commodity or service in the final market area.

10. The system of claim 7, wherein means for weighting the bands according to a market related factor further includes means for weighting the bands based on empirical data drawn from within the preliminary market area.

11. A system for preparing a market study, the system comprising:
    means for defining a geographic area around a selected location, the geographic area corresponding to a market based on a selected maximum travel time;
    means for defining a plurality of bands based on increasing travel time from the location;

means for selecting geographic units in the bands;

means for defining market-related variables for the market;

means for calculating values corresponding to the market-related variables for each of the selected geographic units; and means for calculating a net demand for a service or a commodity in the market based on the values.

12. The system of claim 11, wherein means for selecting the geographic units includes means for determining whether a centroid corresponding to the geographic units falls within at least one of the bands.

13. A computer-readable medium containing instructions, when executed by a computer, for performing a method for determining a market area, the method comprising:

receiving a potential market location and a maximum travel time;

defining a preliminary market area around the potential market location using the maximum travel time from that potential market location;

defining, within the preliminary market area, bands reflecting increasing travel time from the potential market location;

weighting the bands according to a market-related factor; and determining a final market area based on the weighted bands.

14. The computer-readable medium of claim 13, further comprising:

determining a market for a desired commodity or service in the final market area based on the weighted bands.

15. The computer-readable medium of claim 14, further comprising:

determining a net demand for the commodity or service in the final market area.

16. The computer-readable medium of claim 13, wherein weighting the bands according to a market related factor further includes weighting the bands based on empirical data drawn from within the preliminary market area.

17. A computer-readable medium containing instructions, when executed by a computer, for performing a method for preparing a market study, the method comprising:

defining a geographic area around a selected location, the geographic area corresponding to a market based on a selected maximum travel time;

defining a plurality of bands based on increasing travel time from the location;

selecting geographic units in the bands;

defining market-related variables for the market;

calculating values corresponding to the market-related variables for each of the selected geographic units; and calculating a net demand for a service or a commodity in the market based on the values.

18. The computer-readable medium of claim 16, wherein selecting the geographic units includes determining whether a centroid corresponding to the geographic units falls within at least one of the bands.

* * * * *

UNITED STATES PATENT AND TRADEMARK OFFICE
CERTIFICATE OF CORRECTION

PATENT NO. : 6,604,083 B1  Page 1 of 1
DATED : August 5, 2003
INVENTOR(S) : G. William Bailey It is certified that error appears in the above-identified patent and that said Letters Patent is hereby corrected as shown below:

<u>Column 10,</u>
Line 26, "claim 16," should read -- claim 17, --.

Signed and Sealed this

Twenty-fifth Day of November, 2003

JAMES E. ROGAN
*Director of the United States Patent and Trademark Office*